United States Patent [19]
Freeman et al.

[11] Patent Number: 5,814,143
[45] Date of Patent: Sep. 29, 1998

[54] ZIRCONIUM MODIFIED SYNTHETIC ALKALI METAL SILICATE PIGMENT AND METHOD OF MAKING

[75] Inventors: Gary M. Freeman, Macon, Ga.; Richard C. Zielke, Weaverville, N.C.

[73] Assignee: J.M. Huber Corporation, Macon, Ga.

[21] Appl. No.: 976,230

[22] Filed: Nov. 21, 1997

[51] Int. Cl.$^6$ .................................................. C08K 3/00
[52] U.S. Cl. ................ 106/450; 106/287.19; 106/286.4; 162/164.1; 523/1
[58] Field of Search ........................... 106/287.19, 286.4, 106/450; 162/164.1; 523/1

[56] References Cited

U.S. PATENT DOCUMENTS

| | | | |
|---|---|---|---|
| 4,640,716 | 2/1987 | Cleland | 106/450 |
| 4,812,299 | 3/1989 | Wason | 106/329.1 |
| 4,863,796 | 9/1989 | Wason | 106/331 |
| 5,106,420 | 4/1992 | Marshall, Jr. | 106/499 |
| 5,112,402 | 5/1992 | Freeman et al. | 106/416 |
| 5,186,746 | 2/1993 | Freeman | 106/416 |
| 5,316,576 | 5/1994 | Freeman | 106/483 |
| 5,591,256 | 1/1997 | Freeman et al. | 106/483 |

FOREIGN PATENT DOCUMENTS 0206837  12/1986  European Pat. Off. .

OTHER PUBLICATIONS

P.J. Moles, "Zirconium Compounds Find New Uses in Surface Coatings", Modern Paint and Coatings, Feb. 1988, pp. 36–39.

"Zirconium Oxycholoride Solution (ZOC)", CAS No. 7699–43–6, Apr. 1985.

"AZC and Bacote 20 Ammonium Zirconium Carbonate Solutions (AZC/AZS)", CAS No. 68309–95–5, Apr. 1985.

*Primary Examiner*—Mark L. Bell
*Assistant Examiner*—Scott L. Hertzog
*Attorney, Agent, or Firm*—Dickinson Wright PLLC

[57] ABSTRACT

A synthetic alkali metal silicate pigment is modified with a source of a water soluble zirconium ion to form an oxy-hydroxy zirconium species precipitate on the pigment surface. The surface modified pigment is made by slurrying the pigment and reacting it with the source of a water soluble zirconium ion. The surface modified pigment provides improvements over conventional synthetic alkali metal silicate pigments in terms of optical properties, particularly in paper applications, and physical properties, particularly in rubber applications. The surface modified pigment is also useful as an extender or replacement for $TiO_2$, a conventional synthetic alkali metal silicate such as a sodium-aluminosilicate pigment, a clay, a calcined clay or the like.

26 Claims, 2 Drawing Sheets

ZIRCONIUM MODIFIED SYNTHETIC ALKALI METAL SILICATE PIGMENT AND METHOD OF MAKING

FIELD OF THE INVENTION

The present invention is directed to a zirconium modified synthetic alkali metal silicate pigment and a method of making, and in particular, to a sodium aluminosilicate pigment having zirconium oxy-hydroxy type species precipitated thereon for improved optical and reinforcing properties, especially when the composition is used as a filler or extender.

BACKGROUND ART

The utilization of synthetic alkali metal silicate pigments as high performance pigments for paints, coatings, rubber formulations, paper applications, fillers, extenders and the like is well known. One type of these kinds of pigments is typically produced by reactions of sodium silicate with kaolin clay conducted under hydrothermal conditions. These clay based synthetic pigments are examples of what the literature calls structured clays and they are characterized by oil absorption criteria, specific pore volumes and efficient light scattering capability. Examples of these types of structured pigments are disclosed in U.S. Pat. Nos. 4,812,299 and 4,863,796 to Wason. Similar but improved structured pigments that are synthetic alkali metal silicates are subsequently disclosed in U.S. Pat. Nos. 5,112,402 to Freeman et al., and 5,186,746, 5,316,576 and 5,591,256 to Freeman.

In the '299 Wason patent, the structured synthetic alkali metal silicate pigments can be identified by a formulation in terms of its oxide constituents as follows:

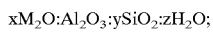

$$xM_2O:Al_2O_3:ySiO_2:zH_2O;$$

wherein x is the number of moles of alkali metal oxide, and is preferably a numerical value from 0.1 to 2.0 m; is an alkali metal; y is the number of moles of $SiO_2$ associated with the composition, and is preferably a numerical value greater than 2.0, and more preferably, between 2.0 and 20.0; and z is the number of moles of bound water, and is preferably a numerical value between zero and 10.0, more preferably between 1.0 and 5.0. The primary particles of these synthetic alkali metal silicate pigments comprise a core of clay platelets having an integral adjacent area of essentially amorphous alkali metal silicate base-kaolin clay reaction product.

In the '746 Freeman patent, a structured sodium aluminosilicate pigment is identified by an empirical formula in terms of its oxide constituents as follows:

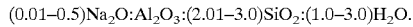

$$(0.01-0.5)Na_2O:Al_2O_3:(2.01-3.0)SiO_2:(1.0-3.0)H_2O.$$

The synthetic alkali metal silicates of the Freeman patents are characterized in terms of pore volume, either total or differential, pore diameter, particle size and oil absorption properties. Preferably, these structured pigments have a total pore volume of at least 2.0 ml/gm. The synthetic alkali metal silicates of the Wason and Freeman patents are both structured materials in which the pigments' pore structure properties can be controlled, and are therefore useful as functional fillers, as $TiO_2$ extenders, as silica extenders or as reinforcing agents for paper, paint, rubber, plastics, coatings and specialty products. Since the various applications for these types of structured materials are well known in the art, a detailed description of the structural characteristics is not necessary for understanding of the invention as described below.

The Wason and Freeman patents are also hereby incorporated by reference in their entirety for their teachings regarding synthetic alkali metal silicate pigments, their properties and structures and their end use applications.

While the high performance pigments identified above offer improved properties when used in various applications, there is always a need to produce a pigment which has even more improved properties, particularly, optical and reinforcing properties. Manufacturers in the paper and rubber industries are constantly seeking ways to improve their products and reduce cost, often times looking to the additives, fillers, extenders and the like for the needed improvement and for achieving a competitive gain in the marketplace.

The present invention solves this need by providing a surface modified synthetic alkali metal silicate pigment having properties, e.g., optical, reinforcing, extending, replacing and the like, superior to other conventional synthetic alkali metal silicate pigments through surface modification of the synthetic alkali metal silicate pigment with a zirconium based precipitate.

In the prior art, the use of zirconium ions to improve optical properties in hydrous kaolin clays is described in EP 0206837 and U.S. Pat. No. 4,640,716 to Engelhard. Engelhard teaches combining kaolin clay with ammonium zirconium carbonate, an anionic species, to improve the optical character of the clay, particularly, light scattering. More specifically, the ammonium zirconium carbonate is added in slurry form to a slurry of kaolin clay. The slurry mixture can then be acidified with sulfuric acid and further processed to recover the treated clay. Treatment of the kaolin clay results in a pigment comprising a dry coating on the clay substrate or a pigment dispersed as a dry filler in a matrix of a fibrous web comprising the substrate. In contrast to the synthetic alkali metal silicate pigments of the Wason and Freeman patents, a hydrous kaolin clay (i.e., kaolinite) is a naturally occurring, crystalline aluminosilicate material having the empirical oxide formula $Al_2O_3:2SiO_2:2H_2O$ and structurally consisting of linked, alternating layers of tetrahedral silicon and octahedral aluminum. The Engelhard patent does not suggest or teach treating or modifying a high performance structured pigment such as a synthetic alkali metal silicate with zirconium by formation of a surface precipitate, particularly through the use of a cationic polymer of zirconium for optical character enhancement or reinforcement.

Zirconium oxychloride solution (ZOC), made by Magnesium Elektron Inc. of Flemington N.J., is a strongly acidic aqueous solution containing the equivalent of 20% by weight of $ZrO_2$. It is known to be useful as a crosslinking agent to alter the rheological properties of natural and synthetic organic polymers with reactive hydroxyl and carboxyl sites in an alkaline medium, a source of zirconium for specialty pigments, as an acid catalyst in resin and silicone finishing of cotton and cotton mixture textiles, etc. The uses suggested by the manufacturer do not include the use of ZOC to improve the properties of high performance pigments such as synthetic alkali metal silicate pigments.

SUMMARY OF THE INVENTION

Accordingly, it is a first object of the present invention to provide a synthetic alkali metal silicate pigment modified with an oxy-hydroxy zirconium species precipitated thereon to improve pigment properties when used as a filler, extender, reinforcing agent, coating agent or the like.

Another object of the present invention is to provide a zirconium modified synthetic alkali metal silicate pigment useful in rubber and paper applications as a substitute, extender or replacement for conventional materials such as kaolin clays in high brightness, delaminated, calcined or silane surface treated form, conventional synthetic alkali metal silicate pigments, titanium dioxide, silicas, zeolites or amorphous zeolitic-like compositions, calcium carbonates, talcs in either surface treated or untreated form, or other known fillers, extenders, reinforcing agents, etc.

A still further object of the present invention is to provide a method of making the zirconium modified synthetic alkali metal silicate pigment.

Another object of the present invention is to provide a composition combining the inventive pigment with other materials useful as fillers, extenders, coating agents or reinforcers in various applications, e.g., paper, rubber, paint, coatings or the like.

One further object of the invention is the use of a sodium aluminosilicate pigment, preferably one that is a structured pigment, as a substrate to receive the zirconium oxy-hydroxy precipitate.

Other objects and advantages of the present invention will become apparent as a description thereof proceeds.

In satisfaction of the foregoing objects and advantages, the present invention is characterized as an improvement over conventional synthetic alkali metal silicate pigments such as those disclosed in the Wason and Freeman patents mentioned above. According to the invention, the structured pigments are modified with oxy-hydroxy zirconium species as precipitates on the pigment surface. The precipitates, while not structurally altering the synthetic alkali metal silicate pigment, provide beneficial results when the zirconium modified pigments are used as extenders, fillers, reinforcing materials, coating agents, opacifiers and the like.

The oxy-hydroxy zirconium species are present in an effective amount to achieve the improvements in properties as noted above and are quantitatively measured in terms of the $ZrO_2$ amounts in wt. % added to the pigment weight in the dry state. While the amount of the zirconium precipitate species may be dependent on the desired performance effects, a preferred amount as measured in terms of $ZrO_2$ on a dry basis ranges between zero and about 5.0 wt. % and preferably about 0.1 and 2.0 wt. %. A more preferred range is about 0.2 and 1.0 wt. %, and, most preferably, about 0.25 and 0.7 wt. %.

Any known source of water soluble zirconium ions in acidic form can be used in combination with the synthetic alkali metal silicate pigment, which is an alkaline composition, to form the oxy-hydroxy zirconium precipitate species on the surface of the pigment. It is preferred to use a water soluble cationic zirconium polymer such as a zirconium oxychloride solution which contains the appropriate amount of zirconium based on the concentration of the solution.

The invention is adaptable for any known synthetic alkali metal silicate pigment including those disclosed in the Wason '299 patent with the formulation as follows:

$xM_2O:Al_2O_3:ySiO_2:zH_2O;$ wherein x is the number of moles of alkali metal oxide, and is preferably a numerical value from 0.1 to 2.0, M is an alkali metal, y is the number of moles of $SiO_2$ associated with the composition, and is preferably a numerical value greater than 2.0, and more preferably between 2.0 and 20.0, and z is the number of moles of bound water and is preferably a numerical value between zero and 10.0, more preferably between 1.0 and 5.0.

A preferred synthetic alkali metal silicate pigment is a structured sodium aluminosilicate having the formulation in terms of its oxide constituents as follows:

such as those disclosed in the Freeman patents noted above. However, formulations using alkali metals other than sodium, e.g., potassium or lithium, can be employed.

In the method aspect of the invention, the synthetic alkali metal silicate pigment to be modified with zirconium is slurried in water or used in dispersed filter cake form and mixed with a source of acidic zirconium ions, preferably a source of water soluble cationic zirconium polymers. The acidic zirconium ions then react with the synthetic alkali metal silicate pigment, which is an alkaline composition, to produce an insoluble surface modified material whose $ZrO_2$ content, in an effective amount, enhances the properties of the precursor pigment material. In a preferred mode, the synthetic alkali metal silicate pigment is slurried to between 5 and 30 wt. % solids and mixed, under alkaline pH conditions, with a zirconium oxychloride solution supplied in amounts necessary to precipitate the zirconium oxy-hydroxy species at a level of 0.1 to 2.0 wt. % $ZrO_2$ on to the pigment, the wt. % based on the weight of zirconium oxide added to the weight of the synthetic pigment on a dry basis. Preferably, the slurry pH is greater than 8.0 and, more preferably, is between 9.5 and 11 during the mixing step.

The zirconium modified synthetic alkali metal silicate pigment can be used alone as an opacifying pigment, filler or reinforcing material in any application typical of these types of materials, e.g., paper, rubber, paint, paperboard coatings and the like. Alternatively, the inventive pigment can be combined with other types of fillers, extenders, reinforcing materials, etc., for improved results. The pigment of the invention can also be used to replace another filler in a given system. Examples of materials that the inventive pigment can be used in place of or in combination with include kaolin clay products such as high brightness waterwashed, calcined, silane surface treated or delaminated clays, conventional sodium aluminosilicate pigments, titanium dioxide, silicas, natural and synthetic zeolites or amorphous zeolitic-like materials, calcium carbonates, talcs in silane surface treated or untreated form, carbon black or the like. In use, the inventive pigment can be combined with the conventional filler, reinforcer, coating agent or extender material as is well known in the art.

BRIEF DESCRIPTION OF THE DRAWINGS

Reference is now made to the drawings of the invention wherein.

DESCRIPTION OF THE PREFERRED EMBODIMENTS

Figure 1:
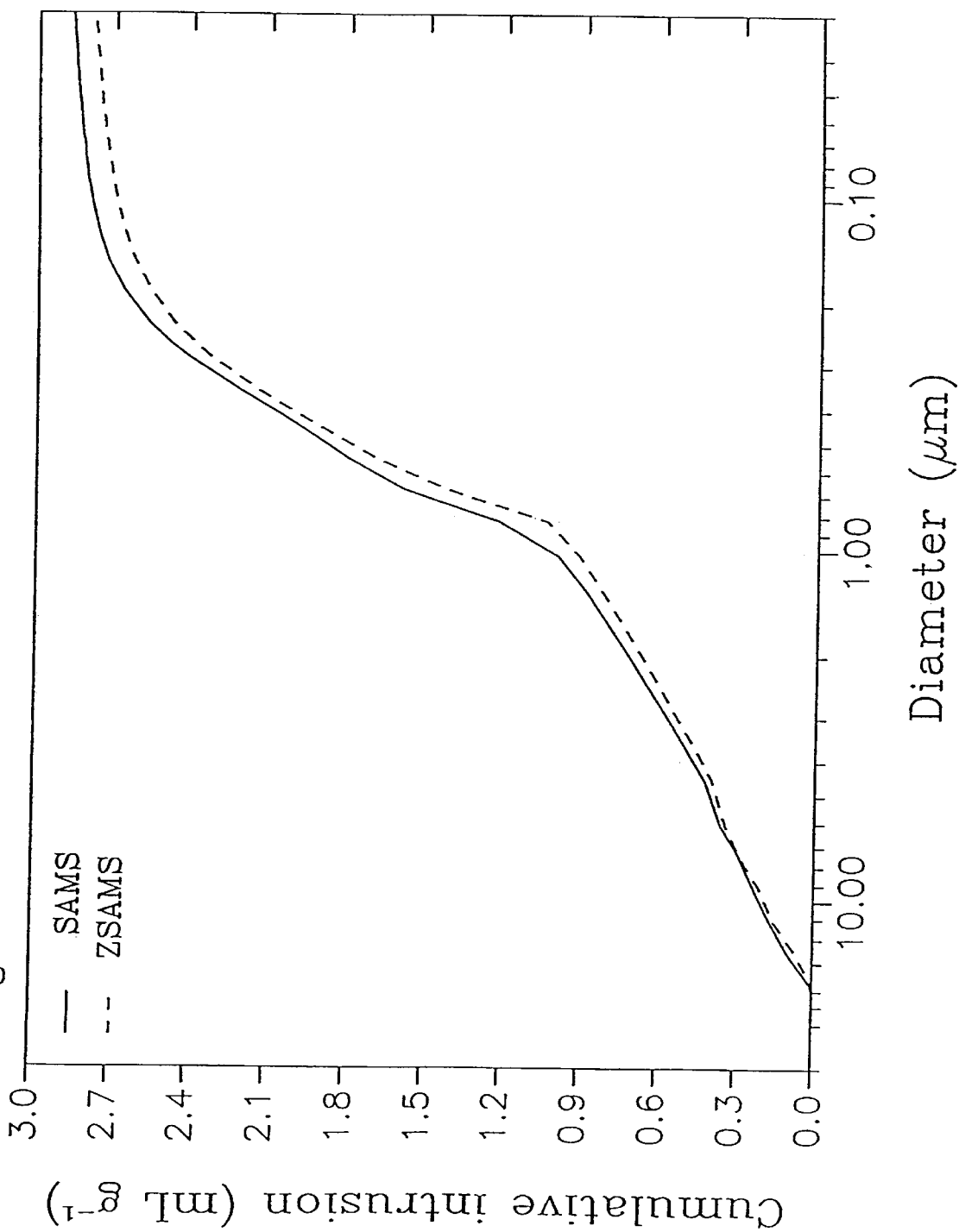
FIG. 1 is a total pore volume curve which plots cumulative intrusion volume (in ml/g) versus pore diameter (in microns), as determined by mercury intrusion porosimetry, for the inventive pigment and a prior art sodium aluminosilicate pigment.

The pigment of the invention is a zirconium modified synthetic alkali metal silicate. The zirconium is in the form of an insoluble species, most likely a zirconium oxy-hydroxy composition, which is precipitated on to the surface of the pigment to enhance its end use properties, e.g. optical and reinforcement. The substrate to receive the zirconium can be any synthetic alkali metal silicate pigment. One set of pigments to be used as a substrate is the family of examples disclosed in U.S. Pat. No. 4,812,299 to Wason wherein the synthetic alkali metal silicate pigment is characterized as a structured alkali metal aluminosilicate having an overall composition of $xM_2O:Al_2O_3:ySiO_2:zH_2O$; wherein x is the number of moles of alkali metal oxide, M is an alkali metal, y is the number of moles of $SiO_2$ associated with the composition and z is the number of moles of bound water. Any of the numerous types of structured synthetic alkali metal silicates as disclosed by Wason can be utilized as a substrate for the inventive pigment, including those prepared from sodium, potassium and lithium silicates and those being derived from coarse particle sized delaminated clay.

The synthetic alkali metal silicates disclosed in the Freeman patents can also be employed as substrates for the inventive pigment. These structured pigments are characterized by an empirical oxide formula as follows:

$(0.01-0.5)Na_2O:Al_2O_3:(2.01-3.0)SiO_2:(1.0-3.0)H_2O.$

Other substrates for the invention include the amorphous or crystalline zeolite compositions described in the '299 Wason patent referenced above and similar materials. Since these zeolite or zeolitic-like materials are well-known in the art, a further description thereof is not deemed necessary for understanding of the invention. Examples of the amorphous, zeolitic-like materials include those sold by J. M. Huber Corporation under the trademark Zeolex, for example, Zeolex 23, and the like.

The source of zirconium to be combined and subsequently precipitated on to the synthetic alkali metal silicate pigments can be any water-soluble, acidic zirconium ion capable of reacting with the strongly basic hydroxylated surface of the synthetic alkali metal silicate pigments. Regardless of the source, the water-soluble zirconium ions produce an insoluble surface modified material having a zirconium oxide content which enhances the properties of the precursor substrate material.

A preferred source of the water-soluble zirconium ions is zirconium oxychloride (ZOC). As noted above, this material is a strongly acidic material which when reacted with the appropriate basic material, either solid or soluble, results in precipitation of a amorphous oxy-hydroxy zirconium species.

Alternatively, other strongly acidic cationic zirconium polymers such as zirconium nitrate could be used as the source of zirconium material. Again, the strongly acidic zirconium materials react with the strongly basic surface of the synthetic alkali metal silicates to produce the insoluble precipitate on the pigment surface.

The amount of zirconium precipitate, e.g., wt. %, should be at a sufficient level to achieve the desired results in the end product modified synthetic alkali metal silicate pigment. It is believed that the wt. % to be added on a dry basis on the synthetic pigment includes amounts up to 5% as $ZrO_2$. A more preferred range of $ZrO_2$ is between about 0.1 and 2.0 wt. %. Even more preferred ranges include between about 0.2 and 1.0 wt. % and between about 0.25 and 0.7 wt. %.

The amount of zirconium is measured in terms of zirconium oxide (i.e., $ZrO_2$) as a matter of convention rather than a strict rule. When using zirconium oxychloride as the source of zirconium, the zirconium content is expressed in terms of wt. % of $ZrO_2$. More specifically, the zirconium oxychloride is typically supplied as a zirconium oxychloride solution containing 20 wt. % $ZrO_2$. Thus, if a target modification level is 10 lbs. $ZrO_2$ per ton of pigment, 50 lbs. of zirconium oxychloride solution per ton would be required. In another example, 20 lbs. of $ZrO_2$ per ton of pigment would require 100 lbs. of the zirconium oxychloride solution per ton of pigment. In terms of overall wt. %, the addition of ZOC solution at 10 lbs. of $ZrO_2$ per ton of pigment translates to 0.5% by weight $ZrO_2$. When using 20 lbs. of $ZrO_2$ per ton of pigment, the overall wt. % would translate to 1.0 wt. % $ZrO_2$. These calculations also assume that the $ZrO_2$ supplied as part of the zirconium oxychloride solution precipitates on the pigment substrate's surface during processing. This assumption is supported by close correspondence between the feed amount of zirconium oxide used in example 1 as described below and the wt. % of zirconium oxide found in the final product by elemental analysis.

It is believed that regardless of the source of acidic zirconium ion, the appropriate adjustment can be made in the feed amount of the source material to obtain the desired wt. % of $ZrO_2$ precipitated on the pigment's surface as described above.

The method of making the inventive zirconium modified pigment entails a reacting or precipitating step under aqueous conditions. More specifically, the synthetic alkali metal silicate pigment is provided in a slurry form. The pigment slurry is typically derived from dispersed filter cake product associated with the manufacture of the synthetic alkali metal silicate pigment or it can be produced by slurry makedown of dry pigment in water. The solids content of the pigment slurry can vary as long as the slurried pigment can be adequately mixed with a source of zirconium ions in aqueous form. In a preferred embodiment, a synthetic alkali metal silicate substrate is slurried to between 5 and about 30 wt. % solids. The slurry is mixed with the zirconium oxychloride solution so that the basic synthetic alkali metal silicate can undergo an acid/base reaction with the cationic zirconium ions in their aqueous form.

While any source of cationic zirconium ions in aqueous form can be used to affect the precipitation of the oxyhydroxy zirconium species on to the surface of the pigment, it is preferred to react the aqueous slurry of the pigment with a zirconium oxychloride solution. The amount of zirconium oxychloride solution utilized in the reaction is determined based on the wt. % range of $ZrO_2$ desired on the final modified pigment.

The soluble zirconium oxide solution is mixed with the aqueous slurry of the alkali metal silicate pigment so that an acid/base reaction occurs between the acidic zirconium solution and the basic synthetic alkali metal silicate pigments to achieve the precipitation of the insoluble oxyhydroxy zirconium species at the pigment surface.

It is preferred to conduct the reaction between the alkali metal silicate pigment and the zirconium solution under alkaline slurry conditions, preferably at a pH greater than 8.0 and, more preferably, at a pH between 9.5 and 11.0.

Once the source of zirconium ions and aqueous slurry of pigment are combined, the zirconium modified pigment slurry can than be recovered as would be known in the art. One option is to merely spray-dry the product slurry and, if necessary, grind or mill the spray-dried material to the desired mesh size. Alternatively, the zirconium modified pigment slurry can be filtered using a rotary vacuum filter or similar filtration device and the filter cake flash-dried and, if necessary, post-milled. Of course, other known methods of recovery of the zirconium modified pigment can be utilized.

The present inventive pigments offer significant improvements over conventional synthetic alkali metal silicates such as those disclosed in the above-referenced Wason and Freeman patents when used in applications such as fillers, extenders, reinforcing agents, and the like.

By surface modifying these types of conventional synthetic pigments with zirconium, improvements are particularly realized in terms of optical properties in paper applications, i.e., light scattering efficiency. Because of this, the inventive pigment can be used as a replacement and/or extender for conventional synthetic alkali metal silicates, calcined clays or titanium dioxide in paper applications.

The inventive pigment is also available for use in combination with kaolin clays as a filler in paper systems. Because of the modified pigment surface, improvements in systems previously using a conventional synthetic alkali metal silicate product in combination with a clay filler are realized. These types of clays include high brightness and fine particle size kaolin clays. A fine particle size clay is defined for purposes of the invention as one having a median particle size (i.e., an average Stokes equivalent paticle diameter) ranging between about 0.1 and 0.7 microns as determined by a x-ray sedigraph. Other types of clays that can be used in combination with the inventive pigment include calcined kaolin clays, silane-treated clays, delaminated clays or other known clays.

The inventive pigment is also extremely effective in rubber applications, particularly white elastomeric compounds requiring high loading levels of titanium dioxide. Using the inventive pigment, the titanium dioxide content can be reduced thereby achieving an economic benefit due to the reduction in the amount of the high cost $TiO_2$. Reducing the amount of $TiO_2$ employed can also provide rubber performance benefits in terms of improving the UV resistance of the compound, which can be very important in applications such as the white sidewall component of tires or in white roofing granules. Adjustment of the inventive pigment's pH value to below 7.0 before compounding the rubber formulation using said pigment can also improve rubber physical properties.

The inventive pigment is also useful when compared with calcined clays due to its very low abrasion properties. Consequently, the inventive synthetic pigments provide superior paper filling properties over calcined clays. Applications involving high levels of fillers can also benefit using the inventive pigment as will be demonstrated below.

Expensive functional fillers such as fumed or precipitated silicas and silicate gels, synthetic silicates, synthetic calcium silicates and related compounds can also be replaced or extended using the inventive zirconium modified pigments.

With its ability to extend or replace conventional fillers, extenders, reinforcing agents, coating agents and the like, the invention also provides articles of manufacture comprising paper, rubber, paper coatings and the like, all of which containing the inventive zirconium modified pigment as at least a part thereof.

It should be understood that the applications disclosed in the '299 Wason patent for the synthetic alkali metal aluminosilicates disclosed therein are applicable to the inventive zirconium modified pigment.

As part of the following examples, various prior art materials were tested in conjunction with the inventive zirconium modified synthetic alkali metal silicate pigment. The following listing identifies the inventive material and the various prior art materials used in the examples:

"ZSAMS" is the designation given for the inventive pigment material in the examples below.

SAMS #1 is a prior art, structured synthetic alkali metal silicate material as taught in U.S. Pat. No. 4,812,299, e.g., example #2.

Hydrasperse clay is a No. #2 type kaolin clay, having an average Stokes equivalent particle diameter of about 0.7 micron, which is used as a paper filler or as a coating pigment. It is produced by J. M. Huber Corporation of Macon, Ga.

SAMS #2 is another prior art, structured synthetic alkali metal silicate pigment as described in U.S. Pat. Nos. 5,186,746, 5,316,575 and 5,591,256 to Freeman.

HYCAL is a high brightness, fine particle size calcined kaolin clay available from J. M. Huber Corporation of Macon, Ga.

SAMS #3 is a prior art, structured synthetic alkali metal silicate pigment having a base/clay molar ratio of 0.25 produced from a coarse particle size, delaminated clay in accordance with the teachings of Example 7 in U.S. Pat. No. 4,812,299 to Wason.

Clay A is a Nucap™ type silane-treated clay. Clay A was prepared from an 88% brightness (TAPPI), fine particle size, east Georgia kaolin clay which was surface treated with a 0.35% treatment level of mercaptopropyltrimethoxysilane. The Nucap™ type clays are commonly used as reinforcing fillers in sulfur-cured rubber formulations and are available from J. M. Huber Corporation of Wrens, Ga.

Other nomenclature in the examples are identified as follows: ps—particle size in terms of microns; %LOI—loss on ignition; and fine particle size clay—a hydrous kaolin clay having a median particle size of about 0.1 to 0.7 microns as determined by a x-ray sedigraph. The physical and chemical data reported herein were determined as follows. Pigment pH values were determined using a standard pH meter on a specified % solids (by weight) mixture of the pigment with deionized water in accordance with the ASTM D-1208, E-70 procedure. The % brightness values are standard TAPPI brightness numbers as determined with a Technidyne Micro TB-1C brightness meter in accordance with the TAPPI Method T646 om-86 procedure. All Sedigraph particle size measurements, whether determining the wt. % of particles<a specified micron particle size or determining the median particle size value in microns, were made via an x-ray sedimentation method based on Stokes Law using a Micromeritics model 5000 ET Sedigraph unit. BET Surface Areas were determined by the nitrogen absorption method described by Brunauer, Emett, and Teller in the "Journal of the American Chemical Society," Volume 60, page 309, published in 1938. A multi-point surface area determination was made on the clay test samples after outgassing them at 130 deg. C. using a Micromeritics model Gemini III 2375 unit. The chemical analysis data for Ti, Fe, Al, Si, Na and Zr content were all determined by x-ray fluorescence analysis using a Philips PW 1404/00 Model XRF unit in which the results were expressed in terms of wt. % per their corresponding oxides. The ignition loss (LOI) values, in wt. %, were determined by pre-drying the SAMS or ZSAMS test samples to a constant weight at 110° C., then heating them to 925° C. for 1 hour and cooling to determine the resultant weight loss. Pore structure properties, such as Total Pore Volume, were determined by Hg Intrusion Porosimetry using a Micromeritics model AutoPore-II 9220 porosimeter in accordance with the analysis method outlined in U.S. Pat. Nos. 5,186,746, 5,316,576 and 5,591,256. Oil absorption values were determined by the spatula rub-out method of ASTM-D.281 using linseed oil.

The following examples are intended to illustrate the inventive pigment, its method of making and its applications and are not deemed limiting in terms of the scope of the invention. Percentages are in weight where not noted.

EXAMPLE 1

3,000 g SAMS #1 was dispersed in 12,000 g $H_2O$ for a period of 5 minutes using a low speed/low shear Lightnin mixer equipped with a 3" twin turbine blade. A volume of ZOC solution equivalent to 5, 10, 20, and 30 lbs. of $ZrO_2$/ton of SAMS #was added dropwise using a burette over a period of 20 minutes under the above mixing conditions. Since ZOC solution is 20% active $ZrO_2$ on a weight basis and has a density of 1.36 g/ml, production of 5 lbs. $ZrO_2$/ton ZSAMS required 27.6 ml of ZOC solution be added to the 3,000 g of SAMS #1. Modification reactions to produce precipitate of higher $ZrO_2$ levels required appropriate multiples of this volume. The resulting 20% solids modified pigment slurry was then spray-dried on a Nichols model 53 spray drier. The spray-dried material was lightly milled in a micropulverizer to pass a 0.062" screen. Results of physical and chemical characterization are presented in Table 1.

Several observations on the trends of data presented in Table 1 with increasing $ZrO_2$ level are worth noting. Firstly, the % $ZrO_2$ treatment level corresponding to 5, 10, 20, and 30 lbs. of $ZrO_2$/ton were 0.25, 0.5, 1.0, and 1.5%, respectively. These % $ZrO_2$ levels present in the final product indicate that quantitative precipitation of insoluble zirconium species on to the SAMS pigment occurred. The increase in loss on ignition with zirconium treatment level supports the premise of precipitation of a zirconium oxy-hydroxy species. Over the range of treatment levels employed, % $Al_2O_3$ and % $SiO_2$ values decreased proportionally with increasing content of % $ZrO_2$, implying no structural loss of silicon or aluminum occurred. Insignificant differences in dry pigment whiteness and brightness with increasing % $ZrO_2$ content were observed.

Figure 2:
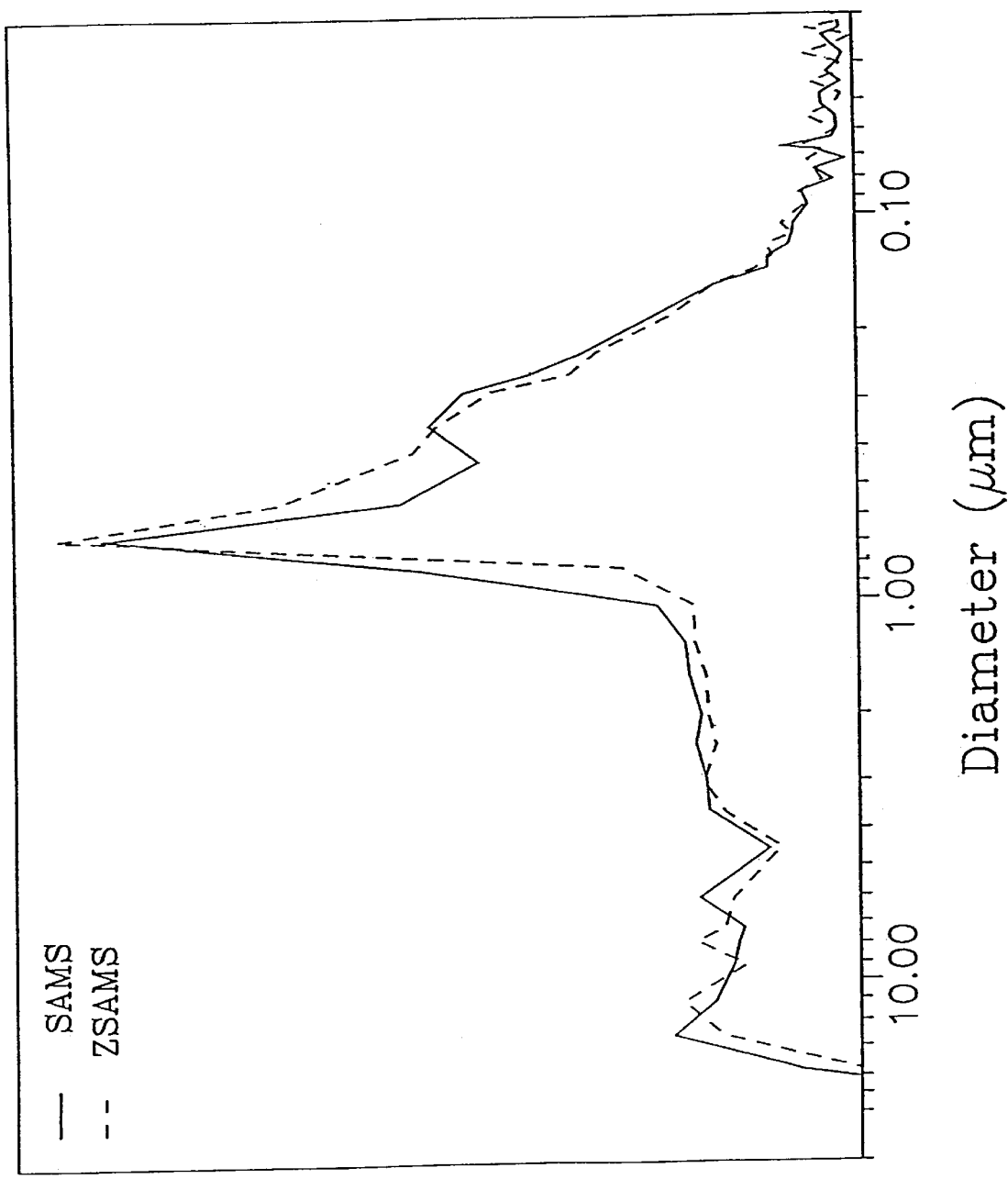
FIG. 2 is a pore size distribution curve which plots log differential intrusion versus pore diameter (in microns) for the inventive pigment and a prior art sodium aluminosilicate pigment.

Surface area as measured by $N_2$ BET adsorption increased with $ZrO_2$ modification, however cumulative pore area as measured by mercury intrusion was unchanged over the region measured. $N_2$ BET adsorption measures pores approximately the diameter of the $N_2$ molecule and larger, whereas mercury porosimetry measurements focused on pore size distributions between 14 and 0.03 micron. The increased BET surface area suggests that the oxy-hydroxy zirconium precipitate contained micropores not measured by mercury intrusion. Porosimetry data as illustrated in FIG. 1 indicate pigments of similar structure although a slight decrease in cumulative intrusion resulted between the SAMS #1 control and the ZSAMS with 10 lbs. $ZrO_2$/ton. Pore size distributions for the control and the ZSAMS with 10 lbs. $ZrO_2$/ton are illustrated in FIG. 2. Treatment with ZOC appears to have resulted in the filling of some of the pores which are centered around 0.3 micron, effecting a reduction in the bimodal pore size distribution of the SAMS #1 material. Oil absorption values and particle size distributions of the treated vs. untreated materials were not judged to be significantly different.

In summary and of greatest importance, these data confirm the quantitative precipitation of insoluble zirconium oxy-hydroxy type species on the surface of SAMS #1. Other than this precipitation, little if any structural or chemical alteration of the SAMS substrate occurred. SEM micrographs and porosimetry analyses substantiate that no observable morphological alterations resulted from the treatment of the SAMS #1 pigment with the strongly acidic ZOC. On the basis of their elemental analyses, the ZSAMS and the SAMS #1 of Table 1 represent a group of materials whose composition can be generically expressed in terms of the following oxide formula:

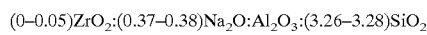

$(0–0.05)ZrO_2:(0.37–0.38)Na_2O:Al_2O_3:(3.26–3.28)SiO_2$

TABLE 1

Physical and Analytical Data for SAMS & ZSAMS Materials

| Parameter | SAMS #1 | SAMS #1 + $ZrO_2$ @ 5#/ton | SAMS #1 + $ZrO_2$ @ 10#/ton | SAMS #1 + $ZrO_2$ @ 20#/ton | SAMS #1 + $ZrO_2$ @ 30#/ton |
|---|---|---|---|---|---|
| ps % + 10μ | 0 | 0 | 0.5 | 0 | 1 |
| ps % + 5μ | 0 | 1.5 | 2 | 1 | 1 |
| ps % – 2μ | 71.5 | 69.5 | 68.5 | 76.5 | 73 |
| ps % – 1μ | 44 | 45.5 | 46 | 52 | 49 |
| ps % – 0.5μ | 21.5 | 24.5 | 25 | 31 | 29 |
| Oil Abs. (ml/100 g) | 140 | 138 | 141 | 144 | 141 |
| BET S.A. ($m^2$/g) | 19 | 22.3 | 21.7 | 23 | 24.1 |
| % Brightness | 93.84 | 93.86 | 93.89 | 94.01 | 94.04 |
| Whiteness | 87.81 | 87.68 | 87.71 | 87.85 | 87.81 |
| Yellowness | 2.06 | 2.08 | 2.08 | 2.06 | 20.5 |
| % LOI | 12.1 | 12.23 | 12.35 | 12.62 | 12.85 |
| % $TiO_2$ | 0.431 | 0.404 | 0.394 | 0.411 | 0.401 |
| % $Fe_2O_3$ | 0.642 | 0.658 | 0.631 | 0.620 | 0.619 |
| % $Al_2O_3$ | 27.636 | 27.498 | 27.373 | 26.965 | 26.563 |
| % $SiO_2$ | 53.083 | 52.952 | 52.783 | 52.245 | 51.323 |
| % $Na_2O$ | 6.197 | 6.214 | 6.188 | 6.090 | 6.083 |
| % $ZrO_2$ | 0.000 | 0.237 | 0.535 | 1.084 | 1.569 |
| Total Pore Vol. (ml/g) | 2.87 | | 2.79 | | |
| Pore Area ($m^2$/g) | 25.22 | | 25.99 | | |

EXAMPLE 2

The SAMS #1 and ZSAMS materials described in EXAMPLE 1 were evaluated as wet-end fillers in paper. Hand sheets containing 6 and 12 parts filler were formed using Tappi Method T205 om-88, rev. 1988, titled "Forming handsheets for physical testing of pulp". The furnish was 60% AO-2 hardwood and 40% International pine. Freeness and basis weights were 350 csf and 40#/ream respectively. Alum was added at the rate of 4.0 wt. % on pulp and 0.025 wt. % Betz 1260 was used as a retention aid. Paper optical properties including opacity, brightness, whiteness and pigment scattering coefficient were evaluated on 5 handsheets formed from each pigment. The averaged results are reported in Table 2A.

In every case but the 30 lbs. $ZrO_2$/ton sample at the 12 part filler level, ZSAMS resulted in increased sheet opacity when compared to the SAMS #1 control. Sheet opacity was particularly improved at the 10 lbs. $ZrO_2$/ton, 6 parts filler level, and the 10 lbs. $ZrO_2$/ton and 20 lbs. $ZrO_2$/ton 12 parts filler levels. The brightness values followed a similar trend of improvement; however, the whiteness values showed a significant improvement over the SAMS #1 control, particularly at the lower filler levels. These whiteness improvements are particularly noteworthy and unexpected in light of their pigment whiteness values (see Table 1) versus SAMS #1. Pigment scattering coefficients were in all cases improved by the addition of the zirconium oxy-hydroxy surface modification. The pigment scattering coefficients of the 10 lbs. $ZrO_2$/ton, 6 and 12 parts filler levels were notably improved.

Viewed in greater detail, the results of this filler study may be interpreted as follows. Addition of the zirconium oxy-hydroxy precipitate enhanced the optical performance of SAMS #1 in handsheets. This enhancement appeared to increase with treatment level but eventually diminished at high modification levels (as expressed on a $ZrO_2$ basis) and high filler levels. The optimum level of surface precipitate for this particular precursor pigment was determined to be 10 lbs. $ZrO_2$/ton.

Clearly, the porosimetry data of treated vs. untreated SAMS #1 (as presented in FIG. 2) and the SEM micrograph analysis noted above illustrate that the enhanced optical properties were due to surface precipitated oxy-hydroxy zirconium, and not to changes in pore size distributions, structural or bulking properties as described in U.S. Pat. No. 4,640,716. Enhancements in overall pigment opacity are thus likely provided by a modified surface having greater light scattering efficiency/refractive index. From electrokinetic measurements on these materials, it is known that the addition of an acid to a solid base such as SAMS #1 reduces the magnitude of the negative surface charge, zeta potential and hence interparticle repulsion. The fact that optical properties were enhanced at an intermediate $ZrO_2$ level may be a consequence of the varying extent of electrostatic repulsion between the different ZSAMS particles observed in aqueous solution which may give rise to some spatial pigment distributions in the handsheet which offer more efficient light scattering.

TABLE 2A

Evaluation of SAMS & ZSAMS Materials as Fillers in Paper

| Pigments | Filler Level, Parts | Corrected Opacity, % | Bright, % | White. Index | Scat. Coef. Pig. |
|---|---|---|---|---|---|
| Unfilled | 0 | 70.8 | 82.0 | 60.9 | — |
| SAMS #1 | 6 | 79.7 | 85.5 | 66.5 | 259.5 |
|  | 12 | 83.8 | 87.2 | 70.1 | 217.2 |
| SAMS #1 + | 6 | 80.3 | 85.7 | 68.6 | 279.6 |
| 5# $ZrO_2$/ton | 12 | 84.1 | 87.5 | 70.9 | 237.0 |
| SAMS #1 + | 6 | 80.9 | 85.8 | 68.1 | 302.5 |
| 10# $ZrO_2$/ton | 12 | 84.3 | 87.5 | 71.2 | 243.2 |
| SAMS #1 + | 6 | 80.2 | 86.1 | 68.1 | 275.4 |
| 20# $ZrO_2$/ton | 12 | 84.5 | 87.3 | 69.7 | 243.0 |
| SAMS #1 + | 6 | 80.1 | 85.4 | 66.0 | 280.9 |
| 30# $ZrO_2$/ton | 12 | 83.6 | 86.9 | 69.4 | 218.1 |

As shown in Table 2B, the SAMS pigments (i.e., SAMS #1 and ZSAMS with 10 lbs. $ZrO_2$/ton) also have the added performance benefit of lower abrasion properties versus conventional calcined clays, such as HYCAL. HYCAL is a high brightness, fine particle size calcined kaolin clay commonly used in paper filler and coating applications. In fact the abrasion properties (as measured by the Einlehner test method) of the untreated and treated SAMS #1 pigments were both essentially equivalent to that of Hydrasperse clay, which is a hydrous, #2 type kaolin clay. It is equally interesting to note that the zirconium oxy-hydroxy surface modification had little to no effect on the abrasion properties of SAMS #1.

TABLE 2B

Comparative Einlehner Abrasion Values of Filler Pigments.

| Pigment | Einlehner Abrasion, mg loss |
|---|---|
| HYCAL | 21.4 |
| HYDRASPERSE | 4.0 |
| SAMS #1 | 4.4 |
| SAMS #1 w/10# $ZrO_2$/T | 2.8 |

EXAMPLE 3

The ZSAMS with 10 lbs. $ZrO_2$/ton which appeared to have optimum opacifying effects in EXAMPLE 2 was evaluated in a handsheet study as a extender for $TiO_2$ in paper at total filler levels of 4, 8, and 12 parts. The $TiO_2$ extension capabilities of SAMS #1 and ZSAMS were compared in a wet end filler system that employed a combination of #2 clay (Huber's Hydrasperse clay) and anatase $TiO_2$ pigment. The $TiO_2$ portion of this system (originally 33% by wt. $TiO_2$) was then extended 50% with SAMS #1 or ZSAMS on a 2:1 replacement basis while maintaining a constant filler. Handsheets were formed using Tappi Method T205 om-88, rev. 1988, titled "*Forming handsheets for physical testing of pulp*". The furnish was 60% AO-2 hardwood and 40% International pine. Freeness and basis weights were 354 csf and 40#/ream respectively. Alum was added at the rate of 4.0 wt. % on pulp and 0.025 wt. % Betz 1260 was used as a retention aid. Optical properties including opacity, brightness, whiteness and pigment scattering coefficient were evaluated on 5 handsheets formed from each pigment. The averaged results are reported in Table 3.

With the exception of the 8 parts filler level, the performance data have indicated ZSAMS can extend up to 50% of the $TiO_2$ on a 2:1 replacement basis by-weight without losses in sheet opacity. Brightness values of the handsheets did not appear to be significantly different amongst filler levels, although higher whiteness values again were observed with the 10# $ZrO_2$/T ZSAMS, particularly at the 8 and 12 parts filler levels. The pigment scattering coefficients were improved upon the use of ZSAMS versus the SAMS #1 pigment.

These data illustrate two important points regarding improvements to the SAMS #1 material. One, that ZOC treatment significantly enhanced the optical properties of SAMS #1 in handsheets. Secondly, ZSAMS has improved optical properties such that greater $TiO_2$ extension was obtained.

TABLE 3

Evaluation of SAMS and ZSAMS as $TiO_2$ Extenders in Paper.

| Pigments* | Filler Level, Parts | Corrected Opacity, % | Bright % | White Index | Scat. Coef. Pig. |
|---|---|---|---|---|---|
| Unfilled | 0 | 72.1 | 82.7 | 64.4 | — |
| 67% Hydsp/33% $TiO_2$ | 4 | 77.6 | 84.2 | 64.2 | 226.5 |
| 67% Hydsp/33% $TiO_2$ | 8 | 82.6 | 84.7 | 65.3 | 235.8 |
| 67% Hydsp/33% $TiO_2$ | 12 | 84.4 | 85.3 | 65.7 | 195.9 |
| 50% Hydsp/17% $TiO_2$/ 33% SAMS #1 | 4 | 77.0 | 84.1 | 64.2 | 195.9 |
| 50% Hydsp/17% $TiO_2$/ 33% SAMS #1 | 8 | 81.2 | 84.7 | 64.9 | 207.5 |
| 50% Hydsp/17% $TiO_2$/ 33% SAMS #1 | 12 | 84.0 | 85.3 | 65.7 | 210.8 |
| 50% Hydsp/17% $TiO_2$/ 33% SZAMS w/ 10# $ZrO_2$/T | 4 | 77.5 | 84.1 | 64.6 | 221.5 |
| 50% Hydsp/17% $TiO_2$/ 33% SZAMS w/ 10# $ZrO_2$/T | 8 | 81.6 | 85.1 | 66.2 | 228.9 |
| 50% Hydsp/17% $TiO_2$/ 33% SZAMS w/ 10# $ZrO_2$/T | 12 | 84.5 | 85.5 | 66.9 | 212.2 |

Note:
ZSAMS w/10# $ZrO_2$/T denotes a ZOC modified SAMS #1 made in accordance with Example 1. Hydsp. = Hydrasperse clay.

EXAMPLE 4

SAMS #1 and ZSAMS modified with 10 lbs. $ZrO_2$/ton (per Example 1) were each evaluated in combination with Hydrasperse, a standard #2 clay, as paper filler systems. The weight ratio of SAMS material to clay investigated was 1:1.

Handsheets containing 4, 8 and 12 parts total filler were formed using Tappi Method T205 om-88, rev. 1988, titled "Forming handsheets for physical testing of pulp". The furnish was 60% AO-2 hardwood and 40% International pine. Freeness and basis weights were 354 csf and 40#/ream respectively. Alum was added at the rate of 4.0 wt. % on pulp and 0.025 wt. % Betz 1260 was used as a retention aid. Optical properties including opacity, brightness, whiteness and pigment scattering coefficient were evaluated on 5 handsheets formed from each pigment. The averaged results are reported in Table 4.

The optical properties of the handsheets formed with ZSAMS outperformed those formed with SAMS #1 in every category and at every filler level investigated. The most dramatic difference in sheet opacity occurred at the 8 parts level. This improvement in opacity was accompanied by a 1 point improvement in whiteness index and a 17 point improvement in pigment scattering coefficient. These optical improvements were unexpected since the physical properties of the ZSAMS pigment with 10 lbs. $ZrO_2$/ton did not appear to be significantly different from those of the SAMS #1 pigment, see Table 1.

TABLE 4

Evaluation of ZSAMS/#2 Clay Combination in Paper.

| Pigments* | Filler Level, Parts | Corrected Opacity, % | Bright % | White Index | Scat. Coef. Pig. |
|---|---|---|---|---|---|
| Unfilled | 0 | 72.1 | 82.7 | 64.4 | |
| 50% Hydsp/50% SAMS #1 | 4 | 76.2 | 83.0 | 62.3 | 166.2 |
| 50% Hydsp/50% SAMS #1 | 8 | 79.3 | 83.7 | 62.6 | 165.6 |
| 50% Hydsp/50% SAMS #1 | 12 | 82.2 | 84.4 | 63.3 | 164.9 |
| 50% Hydsp/50% ZSAMS w/10#$ZrO_2$/T | 4 | 76.5 | 83.6 | 63.0 | 179.4 |
| 50% Hydsp/50% ZSAMS w/10#$ZrO_2$/T | 8 | 80.5 | 84.0 | 63.5 | 182.8 |
| 50% Hydsp/50% ZSAMS w/10#$ZrO_2$/T | 12 | 82.4 | 84.5 | 63.9 | 171.2 |

Note:
*ZSAMS w/10# $ZrO_2$/T denotes a ZOC modified SAMS #1 made in accordance with Example 1. Hydsp. = Hydrasperse clay.

EXAMPLE 5

In this example, SAMS #2 was treated with ZOC in an analogous fashion to the previous treatment of SAMS #1 as described in EXAMPLE 1. The treated and untreated versions of SAMS #2 were then evaluated in a wet end paper filler study in order to evaluate their optical properties at high filler levels, and to demonstrate performance functionality when modifying other related alkali metal silicate pigments. SAMS #2 is also a hydrothermal alteration product of kaolin clay having a sodium aluminosilicate composition; but, it has very unique structural properties versus SAMS #1 based on oil absorption, pore volume and particle size criteria as referenced above. HYCAL (a high brightness, calcined kaolin clay commonly used in paper filler and coating applications) was also included in the study for comparative purposes. Handsheets containing 5, 10, 15 and 20 parts filler were formed using Tappi Method T205 om-88, rev. 1988,. titled "Forming handsheets for physical testing of pulp". The furnish was 60% AO-2 hardwood and 40% International pine. Freeness and basis weights were 350 csf and 40#/ream respectively. Alum was added to attain a pH of 4.5 and 0.025 wt. % Betz 1260 was used as a retention aid.

Optical properties including opacity, brightness, whiteness and pigment scattering coefficients were evaluated on 5 handsheets formed from each pigment. The averaged results are reported in Table 5.

Over the filler range explored, SAMS #2 modified with 10 lbs. $ZrO_2$/ton generally outperformed the untreated SAMS #2 pigment with respect to opacity and pigment scattering coefficient, especially at the intermediate filler levels. This opacity advantage with the treated SAMS #2 was also seen relative to the use of Hycal. Sheet brightness and whiteness values between SAMS #2 and treated SAMS #2 were comparable however.

In summary, the opacifying properties of SAMS #2 were significantly improved by its treatment with ZOC at a level of 10 lbs. $ZrO_2$/ton. The treated SAMS #2 pigment performed as well as and often better than HYCAL in opacity. More importantly, the data illustrate generally improved optical properties in paper as the result of precipitating an insoluble zirconium oxy-hydroxy material on the surface of a uniquely different yet related alkali metal silicate pigment.

TABLE 5

High Filler Level Study of ZSAMS Materials in Paper.

| Pigments* | Filler Level, Parts | Corrected Opacity, % | Bright % | White Index | Scat. Coef. Pig. |
|---|---|---|---|---|---|
| Unfilled | 5 | 71.2 | 81.7 | 67.8 | |
| SAMS #2 | 5 | 80.0 | 84.3 | 65.7 | 288.8 |
| SAMS #2 | 10 | 82.9 | 85.5 | 68.2 | 237.4 |
| SAMS #2 | 15 | 85.3 | 86.7 | 70.5 | 213.9 |
| SAMS #2 | 20 | 87.5 | 87.3 | 71.4 | 198.2 |
| SAMS #2 w/10# $ZrO_2$/T | 5 | 79.6 | 84.5 | 65.5 | 283.6 |
| SAMS #2 w/10# $ZrO_2$/T | 10 | 83.8 | 85.9 | 69.3 | 250.2 |
| SAMS #2 w/10 # $ZrO_2$/T | 15 | 86.1 | 86.7 | 70.3 | 221.8 |
| SAMS #2 w/10 # $ZrO_2$/T | 20 | 87.6 | 87.1 | 71.6 | 205.4 |
| HYCAL | 5 | 79.4 | 84.7 | 65.4 | 278.3 |
| HYCAL | 10 | 83.1 | 85.1 | 67.4 | 225.2 |
| HYCAL | 15 | 85.6 | 86.0 | 69.5 | 209.8 |
| HYCAL | 20 | 87.1 | 87.0 | 70.5 | 194.6 |

EXAMPLE 6

ZOC treated and untreated versions of SAMS #1 and of SAMS #3 were evaluated as white, reinforcing fillers in a tire white sidewall (WSW) rubber formulation and compared to the results obtained with Clay A, a Nucap™ type filler clay having a mercapto-silane treatment. ZOC treatment of SAMS #1 and SAMS #3 was accomplished as described in EXAMPLE 1. All SAMS materials were used without pre-treatment or "in situ" addition of any mercapto-silane. The precise screening compound formulation which is a Banbury only, upside down, two pass, dry mix is presented in Table 6A. Pigment properties and the resulting performance parameters when compounded are presented in Table 6B. The values reported in Table 6B represent the average of three independent analyses.

All the filler materials exhibited similar durometer and tensile values in the formulation. The elongation of Clay A was lower than the SAMS pigments, while modulus @ 300% elongation was higher for Clay A indicating more efficient reinforcement than with any of the SAMS materials. The cure rate for this formulation, as measured by the rheometer at 90 cure, was accelerated by the strongly alkaline nature of the SAMS #1 and SAMS #3 pigments.

This result is attributed to the pigment pH values. The effect of alkaline materials as accelerators or conversely, acids as inhibitors in most rubber formulations is well known and documented in the rubber industry. The tear die "C" value of Clay A was higher while trouser tear was lower than with the SAMS materials.

Whiteness values with the SAMS materials in rubber were in all cases higher than with Clay A. Only untreated SAMS #1 exhibited a lower brightness in the WSW formulation than Clay A. Addition of ZOC to either SAMS #1 or SAMS #3 further improved the WSW formulation brightness and whiteness values. The most dramatic optical improvement occurred with the SAMS #3 filler when surface modified with 5 lbs. $ZrO_2$/ton. The exceptionally high brightness and whiteness values obtained in rubber with the 5 lbs. $ZrO_2$/ton SAMS #3 filler was unexpected strictly on the basis of its dry pigment values. But as illustrated by the difference in brightness and whiteness values for SAMS #1 and Clay A, dry pigment brightness/color does not necessarily translate to the rubber formulation.

The most important points to note in this example are the improved brightness and whiteness values afforded by the ZOC modified SAMS #1 and SAMS #3 fillers. Of the filler materials investigated, SAMS #3 modified with 5 lbs. $ZrO_2$/ton resulted in the greatest improvement in WSW brightness and whiteness. Furthermore, with the exception of an accelerated cure rate, only minor differences in physical properties between Clay A and SAMS #3 with 5 lbs. $ZrO_2$/ton were observed.

TABLE 6A

Evaluation of ZSAMS Fillers in a Tire White Sidewall Compound

| Material (Amounts in phr) | Clay A (Sil. Treated Clay) | SAMS #1[1] | SAMS #3[2] |
|---|---|---|---|
| Natural Rubber SMR-L | 60.00 | 60.00 | 60.00 |
| Vistalon 2504 | 20.00 | 20.00 | 20.00 |
| Chlorobutyl HT-1066 | 20.00 | 20.00 | 20.00 |
| Filler | 44.00 | 47.08 | 44.51 |

TABLE 6A-continued

Evaluation of ZSAMS Fillers in a Tire White Sidewall Compound

| Material (Amounts in phr) | Clay A (Sil. Treated Clay) | SAMS #1[1] | SAMS #3[2] |
|---|---|---|---|
| Anatase Titanium Dioxide (Unitane 0-110) | 35.00 | 35.00 | 35.00 |
| Sunolite 240 | 2.50 | 2.50 | 2.50 |
| Sunolite 666 | 2.50 | 2.50 | 2.50 |
| Stearic Acid | 1.00 | 1.00 | 1.00 |
| Ultramarine blue | 0.20 | 0.20 | 0.20 |
| Zinc Oxide | 5.00 | 5.00 | 5.00 |
| Sulfur | 0.50 | 0.50 | 0.50 |
| Vultac 7 | 1.25 | 1.25 | 1.25 |
| Altax | 0.75 | 0.75 | 0.75 |
| Total Mass[3] | 192.70 | 195.78 | 193.21 |

Note:
[1,2] Rubber formulation the same for untreated or ZOC modified filler forms.
[3] Filler levels adjusted based on their specific gravity in order to maintain constant specific gravity in the final rubber formulation.

TABLE 6B

Evaluation of ZSAMS Fillers in a White Sidewall Rubber Formulation

| Test Parameter | SAMS #1 | SAMS #1 + 10# $ZrO_2$/T | SAMS #1 + 15# $ZrO_2$/T | SAMS #3 | SAMS #3 + 5# $ZrO_2$/T | Clay A |
|---|---|---|---|---|---|---|
| pH @ 10% Solids (filler) | 10.75 | 10.10 | 9.20 | 10.40 | 8.60 | 5.80 |
| % Brightness (filler) | 92.12 | 92.12 | 91.94 | 88.79 | 88.81 | 86.79 |
| Whiteness Index (filler) | 81.51 | 81.45 | 81.59 | 74.37 | 74.48 | 71.24 |
| Rheometer (T = 90%, min) | 6:00 | 6:38 | 6:15 | 7:23 | 7:45 | 17:30 |
| Durometer (Shore A, pts) | 54 | 55 | 56 | 57 | 56 | 54 |
| Tensile (psi) | 2020 | 2040 | 2000 | 2110 | 2030 | 2140 |
| Elongation (%) | 710 | 700 | 670 | 660 | 650 | 590 |
| Modulus @ 100% E (psi) | 180 | 190 | 200 | 230 | 230 | 220 |
| Modulus @ 200% E (psi) | 290 | 320 | 330 | 380 | 380 | 450 |
| Modulus @ 300% E (psi) | 410 | 460 | 490 | 540 | 530 | 690 |
| Tear Die "C" (pli) | 162 | 172 | 174 | 181 | 177 | 211 |
| Trouser Tear ISO (pli) | 60 | 55 | 53 | 56 | 54 | 33 |
| % Brightness | 78.20 | 78.94 | 79.09 | 79.70 | 80.91 | 78.62 |
| Whiteness Index | 76.97 | 78.30 | 78.97 | 79.31 | 81.73 | 76.20 |

EXAMPLE 7

The SAMS #3 filler when surface modified with ZOC at 5 lbs. $ZrO_2$/ton exhibited enhanced rubber brightness and whiteness values yet considerably accelerated cure rates when compared to Clay A in EXAMPLE 6. The present example serves to illustrate the performance of a ZOC treated SAMS #3 as a $TiO_2$ extender in a white sidewall (WSW) rubber formulation when further treated to reduce its alkalinity.

SAMS #3 was modified with ZOC at a level of 5 lbs. $ZrO_2$/ton as described in EXAMPLE 6, with the exception that the slurry pH was also adjusted to 7.0 with 1M $H_2SO_4$ followed by addition of iron free Alum (8.1 wt. % $Al_2O_3$) to a pH of 5.5. Clay A and this ZOC treated SAMS #3 were then formulated in a Banbury only, upside down, two pass, dry mixer WSW screening compound as detailed in Table 7A. The physical and optical properties of the compound resulting from replacement of 0, 5 and 10 phr $TiO_2$ pigment with ZSAMS as compared to the Clay A control are illustrated in Table 7B.

Reduction of the alkalinity of SAMS #3 after ZOC addition drastically inhibited the cure rate (rheometer) compared to that observed in EXAMPLE 6. This improvement is particularly significant since rapid cure rates tend to promote scorch and brittleness in the compound. Interestingly modulus values were also improved by this reduction in filler pH, both in the control and in the formulations with 5 and 10 parts TiO$_2$ replaced (compare values of EXAMPLE 6). A difference of 10% between these values is considered significant. While some of the differences in physical properties are borderline significant in this sense, several trends are worth noting. In particular, durometer, modulus at 100, 200 and 300% elongation, tear die "C", and trouser tear all tended to increase with increasing TiO$_2$ replacement, suggesting more efficient reinforcement. Tensile and elongation values tended to decrease with increasing TiO$_2$ replacement. Rubber brightness and whiteness values of the modified SAMS #3 compound were significantly improved over those of Clay A. This is partially though not completely related to the brightness and whiteness values for the pigments themselves. Upon increasing replacement of TiO$_2$ with modified SAMS #3, rubber brightness and whiteness values were diminished to approach those of the Clay A control formulation.

The results discussed above clearly illustrate three significant points which represent improvements to the WSW rubber formulation utilized in EXAMPLE 6. Firstly, pH adjustment of the moderately alkaline SAMS #3 material after modification with 5 lbs. ZrO$_2$/ton inhibited the cure rate and reduced the potential for scorch and brittleness. Secondly, replacement of TiO$_2$ pigment with modified SAMS #3 tended to result in improved physical properties while having brightness and whiteness values equal to or better than those observed for Clay A. Lastly, modified SAMS #3 yields additional performance value in that about 28% of the total TiO$_2$ originally added to WSW rubber formulations may be replaced with no detrimental effects on final optical properties.

TABLE 7A

White Sidewall Compound for Evaluation of ZSAMS as a TiO$_2$ Extender

| Experiment | Clay A 0 pts TiO$_2$ repl | SAMS #3 + 5 lbs. ZrO$_2$/T & Acid 0 pts TiO$_2$ repl | SAMS #3 + 5 lbs. ZrO$_2$/T & Acid 5 pts TiO$_2$ repl | SAMS #3 + 5 lbs. ZrO$_2$/T & Acid 10 pts TiO$_2$ repl |
|---|---|---|---|---|
| Natural Rubber SMR-L | 60.00 | 60.00 | 60.00 | 60.00 |
| Vistalon 2504 | 20.00 | 20.00 | 20.00 | 20.00 |
| Chlorobutyl HT-1066 | 20.00 | 20.00 | 20.00 | 20.00 |
| Filler (Clay or SMAS) | 44.00 | 44.51 | 52.10 | 59.69 |
| Titanium Dioxide | 35.00 | 35.00 | 30.00 | 25.00 |
| Sunolite 240 | 2.50 | 2.50 | 2.50 | 2.50 |
| Sunolite 666 | 2.50 | 2.50 | 2.50 | 2.50 |
| Stearic Acid | 1.00 | 1.00 | 1.00 | 1.00 |
| Ultramarine Blue | 0.20 | 0.20 | 0.20 | 0.20 |
| Zinc Oxide | 5.00 | 5.00 | 5.00 | 5.00 |
| Sulfur | 0.50 | 0.50 | 0.50 | 0.50 |
| Vultac 7 | 1.25 | 1.25 | 1.25 | 1.25 |
| Altax | 0.75 | 0.75 | 0.75 | 0.75 |
| Total Mass* | 192.70 | 193.21 | 195.8 | 198.39 |

Note:
*Filler levels were adjusted based on their specific gravity in order to maintain constant specific gravity in the final rubber formulation.

TABLE 7B

Evaluation of ZSAMS as a TiO$_2$ Extender in a WSW Rubber Formulation

| Parameter/Expt. | Clay A 0 pts TiO$_2$ repl | SAMS #3 + 5 lbs. ZrO$_2$/T & Acid 0 pts TiO$_2$ repl | SAMS #3 + 5 lbs. ZrO$_2$/T & Acid 5 pts TiO$_2$ repl | SAMS #3 + 5 lbs. ZrO$_2$/T & Acid 10 pts TiO$_2$ repl |
|---|---|---|---|---|
| pH @ 10% Solids | 5.8 | 5.6 | — | — |
| % Brightness | 86.79 | 88.73 | — | — |
| White. Index | 71.24 | 75.00 | — | — |
| Rheometer (T = 90%, | 17:15 | 19:00 | 18:00 | 18:00 |
| Durometer (Shore A, | 54 | 55 | 57 | 59 |
| Tensile (psi) | 1990 | 2010 | 1960 | 1910 |
| Elongation % | 560 | 590 | 580 | 560 |
| Modulus @ 100% E | 240 | 260 | 280 | 310 |
| Modulus @ 200% E | 470 | 470 | 480 | 530 |
| Modulus @ 300% E | 720 | 680 | 700 | 750 |
| Tear Die "C" (pli) | 192 | 176 | 199 | 205 |
| Trouser Tear ISO | 58 | 47 | 50 | 54 |
| % Brightness | 78.8 | 81.36 | 79.73 | 78.79 |
| Whitness Index | 76.18 | 80.68 | 79.06 | 76.44 |

By the examples above, it is clear that the ZSAMS products produced via ZOC modification of various SAMS pigments provide significant improvements when used in various applications. ZSAMS may be used as a wet end filler to enhance opacifying properties in high brightness paper applications. Opacity may be improved by 1–1.5 points over the precursor SAMS depending on the filler level used. Whiteness values but not brightness were also consistently improved by the use of ZSAMS in paper. ZSAMS materials have also performed as good as or better than calcined clay in terms of sheet brightness, whiteness, and opacity, while offering lower abrasion properties.

Because of enhanced opacifying properties when used as a filler, ZSAMS may also be used as a TiO$_2$ extender in paper. Extension of TiO$_2$ pigment up to 50% was obtained with increased whiteness exhibited at filler levels of 4, 8 and 12 parts and with no detrimental effect on brightness and opacity.

When used as a filler in a white sidewall rubber formulation, the ZOC modified SAMS #3 resulted in enhanced brightness and whiteness. When the pH of these alkaline materials was adjusted so as to inhibit the cure rate, some improvements on physical reinforcing properties were also observed. Reinforcement properties were comparable to those provided by a mercapto-silane modified, fine particle clay which was an unexpected beneficial result.

ZSAMS may also be used as a TiO$_2$ extender in rubber, such as in the white sidewall formulations. Relative to a NucapÔ type clay control, brightness and whiteness values were improved at 14% replacement, and maintained at a TiO$_2$ replacement level of 28%. In addition, physical properties tended to be improved with increasing TiO$_2$ replacement.

As such, an invention has been disclosed in terms of preferred embodiments thereof which fulfill each and every one of the objects of the present invention as set forth above and provides a new and improved zirconium modified synthetic alkali metal silicate pigment and method of making.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. In a white surface modified alkali metal silicate pigment, the improvement comprising an effective amount of an oxy-hydroxy zirconium species precipitated on a synthetic alkali metal silicate pigment surface to enhance at least the optical properties of the synthetic alkali metal silicate pigment.

2. The surface modified pigment of claim 1, wherein the synthetic alkali metal silicate pigment is selected from the group consisting of a synthetic alkali metal silicate pigment having an empirical formula in terms of its oxide constituents: $xM_2O:Al_2O_3:ySiO_2:zH_2O$, wherein x is the number of moles of alkali metal oxide and has a numerical value>zero, M is an alkali metal, y is the number of moles of $SiO_2$ associated with the composition and has a numerical value>2.0, and z is the number of moles of bound water and is a numerical value between zero and 10.0, a structured sodium-aluminosilicate pigment having an empirical formula in terms of its oxide constituents:

$$(0.01-0.5)Na_2O:Al_2O_3:(2.01-3.0)SiO_2:(1.0-3.0)H_2O,$$

and an amorphous sodium-aluminosilicate pigment.

3. The surface modified pigment of claim 1, wherein the effective amount of the oxy-hydroxy zirconium species as measured in terms of $ZrO_2$ content ranges between about 0.1 and 2.0 wt. % of the synthetic alkali metal silicate pigment on a dry basis.

4. The surface modified pigment of claim 3, wherein the effective amount ranges between about 0.2 and 1.0 wt. %.

5. The surface modified pigment of claim 4, wherein the effective amount ranges between about 0.25 and 0.7 wt. %.

6. The surface modified pigment of claim 2, wherein the synthetic alkali metal silicate pigment is the structured sodium-aluminosilicate pigment and the effective amount of the oxy-hydroxy zirconium species as measured in terms of $ZrO_2$ content ranges between about 0.1 and 2.0 wt. % of the sodium-aluminosilicate pigment on a dry basis.

7. In a paper composition including a filler, the improvement comprising using the surface modified pigment of claim 1 as at least a portion of said filler.

8. The composition of claim 7, wherein a remaining portion of said filler comprises a material selected from the group consisting of titanium dioxide, a waterwashed kaolin clay, a delaminated clay, a calcined clay, a natural or synthetic silica, a synthetic alkali metal silicate pigment, a zeolite, a calcium carbonate or mixtures thereof.

9. A method of making a white surface modified alkali metal silicate pigment having an effective amount of an oxy-hydroxy zirconium species precipitated thereon to enhance at least the optical properties of the synthetic alkali metal silicate pigment comprising the steps of:
   a) providing the synthetic alkali metal silicate pigment in slurry form;
   b) providing a source of zirconium ions in aqueous form; and
   c) reacting the zirconium ions with the synthetic alkali metal silicate by mixing to form the surface modified alkali metal silicate pigment with the effective amount of the oxy-hydroxy zirconium species precipitated thereon.

10. The method of claim 9, wherein the step of providing the source of the zirconium ions comprises providing a solution of a water soluble cationic zirconium polymer containing said effective amount.

11. The method of claim 9, wherein the effective amount of the zirconium ions measured in terms of $ZrO_2$ content ranges between 0.1 and 2.0 wt. % based on dry synthetic alkali metal silicate pigment.

12. The method of claim 11, wherein the effective amount ranges between about 0.2 and 1.0 wt. %.

13. The method of claim 12, wherein the effective amount ranges between about 0.25 and 0.7 wt. %.

14. The method of claim 9, wherein the synthetic alkali metal silicate pigment is selected from the group consisting of a synthetic alkali metal silicate pigment having an empirical formula in terms of its oxide constituents: $xM_2O:Al_2O_3:ySiO_2:zH_2O$, wherein x is the number of moles of alkali metal oxide and has a numerical value>zero, M is an alkali metal, y is the number of moles of $SiO_2$ associated with the composition and has a numerical value>2.0, and z is the number of moles of bound water and is a numerical value between zero and 10.0, a structured sodium-aluminosilicate pigment having an empirical formula in terms of its oxide constituents:

$$(0.01-0.5)Na_2O:Al_2O_3:(2.01-3.0)SiO_2:(1.0-3.0)H_2O,$$

and an amorphous sodium-aluminosilicate pigment.

15. The method of claim 14, wherein the synthetic alkali metal silicate is the structured sodium-aluminosilicate pigment and the effective amount of the oxy-hydroxy zirconium species as measured in terms of $ZrO_2$ content ranges between about 0.1 and 2.0 wt. % of the sodium-aluminosilicate pigment on a dry basis.

16. The method of claim 9, wherein the reacting step (c) is conducted under alkaline slurry conditions.

17. The method of claim 16, wherein the pH of the alkaline slurry condition is greater than 8.0.

18. The method of claim 9, comprising the step of controlling the pH of the slurry of step (c) to a neutral or an acid condition by addition of at least one acid.

19. The method of claim 18, wherein the step of controlling the pH is carried out using a combination of sulfuric acid and alum.

20. The method of claim 10, wherein the water soluble cationic zirconium polymer used as the source of zirconium ions is a solution of zirconium oxychloride.

21. In a rubber composition including an additive, the improvement comprising using the surface modified pigment of claim 1 as at least a portion of said additive.

22. The composition of claim 21, wherein a remaining portion of said additive comprises a material selected from the group consisting of titanium dioxide, a kaolin clay, a delaminated clay, a calcined clay, a silane treated clay, a synthetic or natural silica, a calcium carbonate, a talc, a silane treated talc, a synthetic alkali metal silicate pigment, a zeolite or mixtures thereof.

23. The composition of claim 21, wherein the rubber composition is a white sidewall rubber formulation for tires and the remaining portion of the additive is titanium dioxide.

24. A paper containing a paper coating, a portion of the paper coating including the surface modified pigment of claim 1.

25. The improvement of claim 1 wherein the surface modified alkali metal silicate pigment consists essentially of the effective amount of the oxy-hydroxy zirconium species precipitated on the synthetic alkali metal silicate pigment surface.

26. The method of claim 9 wherein the surface modified alkali metal silicate pigment consists essentially of the effective amount of the oxy-hydroxy zirconium species precipitated on the synthetic alkali metal silicate pigment surface.

* * * * *